United States Patent
Kang et al.

(10) Patent No.: US 11,237,954 B2
(45) Date of Patent: Feb. 1, 2022

(54) CONTROLLER AND DATA STORAGE SYSTEM HAVING THE SAME

(71) Applicant: SK hynix Inc., Gyeonggi-do (KR)

(72) Inventors: Hye Mi Kang, Gyeonggi-do (KR); Eu Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 42 days.

(21) Appl. No.: 16/895,019

(22) Filed: Jun. 8, 2020

(65) Prior Publication Data

US 2021/0109852 A1 Apr. 15, 2021

(30) Foreign Application Priority Data

Oct. 14, 2019 (KR) .................. 10-2019-0127215

(51) Int. Cl.

| | |
|---|---|
| *G06F 12/02* | (2006.01) |
| *G06F 12/06* | (2006.01) |
| *G06F 1/14* | (2006.01) |
| *G06F 1/12* | (2006.01) |
| *G06F 12/0873* | (2016.01) |

(52) U.S. Cl.
CPC .......... *G06F 12/0246* (2013.01); *G06F 1/12* (2013.01); *G06F 1/14* (2013.01); *G06F 12/0653* (2013.01); *G06F 12/0873* (2013.01); *G06F 2212/7201* (2013.01)

(58) Field of Classification Search
CPC .......... G06F 12/0246; G06F 1/12; G06F 1/14; G06F 12/0653; G06F 12/0873; G06F 2212/7201
See application file for complete search history.

(56) References Cited

U.S. PATENT DOCUMENTS

| | | | | |
|---|---|---|---|---|
| 10,002,084 B1* | 6/2018 | Warkentin | .......... | G06F 12/1027 |
| 10,447,728 B1* | 10/2019 | Steinberg | ................ | H04L 63/20 |

(Continued)

FOREIGN PATENT DOCUMENTS

| | | |
|---|---|---|
| KR | 10-2014-0057454 | 5/2014 |
| KR | 10-2018-0016679 | 2/2018 |

OTHER PUBLICATIONS

A Low Overhead and Consistent Flash Translation Layer for Embedded Devices Utilizing Serial NOR Flash by Fazackerley (Year: 2016).*

(Continued)

*Primary Examiner* — Paul M Knight
(74) *Attorney, Agent, or Firm* — IP & T Group LLP

(57) ABSTRACT

Provided herein may be a controller and a data storage system having the controller. The controller may include a mapping time generator configured to generate a first mapping time at which a logical block address and a physical block address are mapped to each other, an internal memory configured to store first address mapping information including an address map, and the first mapping time, a host interface configured to transmit the first address mapping information to a host, and receive second address mapping information from the host, and a central processing unit configured to generate the address map, store the first address mapping information in the internal memory, compare a second mapping time included in the second address mapping information with the first mapping time, and select a read mode based on a result of the comparison.

19 Claims, 6 Drawing Sheets

(56) References Cited

U.S. PATENT DOCUMENTS

| | | | | |
|---|---|---|---|---|
| 2006/0075236 | A1* | 4/2006 | Marek | H04L 9/0894 |
| | | | | 713/171 |
| 2012/0079164 | A1* | 3/2012 | Hakewill | G06F 12/1009 |
| | | | | 711/6 |
| 2014/0082261 | A1* | 3/2014 | Cohen | G06F 3/0688 |
| | | | | 711/103 |
| 2014/0325123 | A1* | 10/2014 | Higeta | G06F 12/0246 |
| | | | | 711/103 |
| 2019/0004944 | A1* | 1/2019 | Widder | G06F 12/0292 |
| 2020/0034298 | A1* | 1/2020 | Benisty | G06F 12/1009 |

OTHER PUBLICATIONS

Unified Address Translation for Memory-Mapped SSDs with FlashMap by Huang (Year: 2015).*

Enabling Timekeeping Function and Prolonging Battery Life in Low Power Systems by NXP Semiconductors (Year: 2011).*

\* cited by examiner

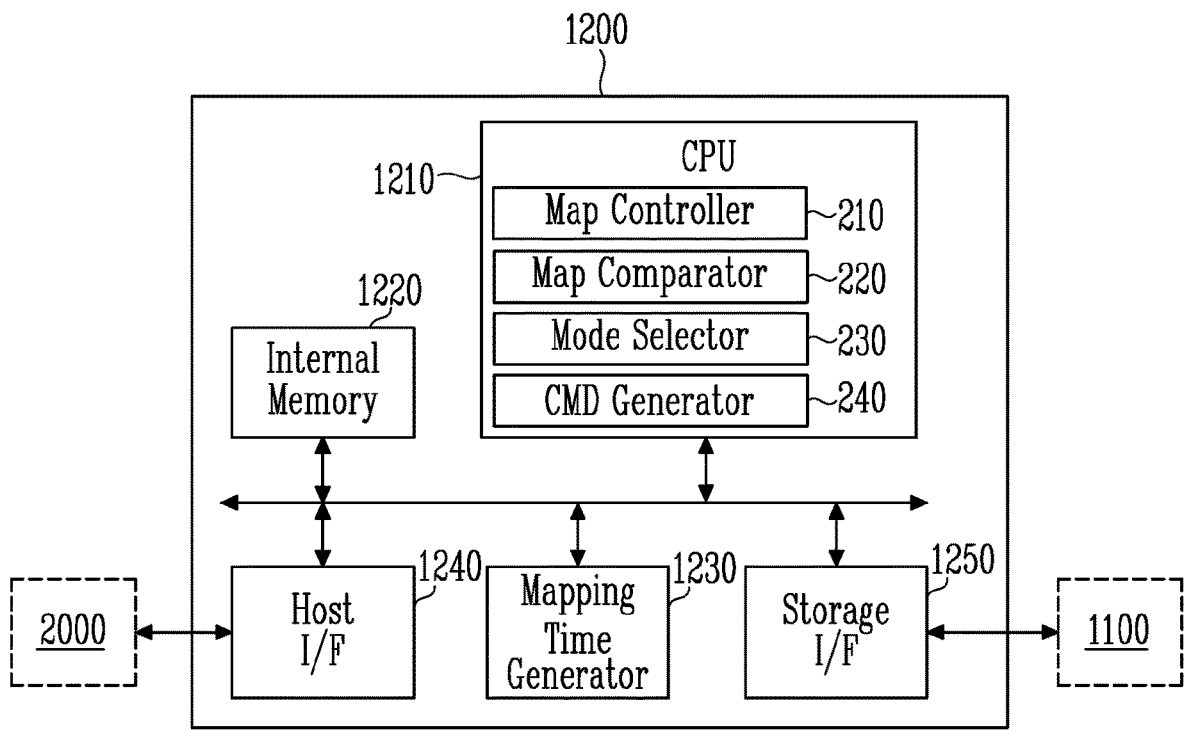

… (1)

CONTROLLER AND DATA STORAGE SYSTEM HAVING THE SAME

CROSS-REFERENCE TO RELATED APPLICATION

The present application claims priority under 35 U.S.C. § 119(a) to Korean patent application number 10-2019-0127215, filed on Oct. 14, 2019, which is incorporated herein by reference in its entirety.

BACKGROUND

Field of Invention

Various embodiments of the present disclosure relate to a controller and a data storage system having the controller, and more particularly, to a memory system having a controller and a data storage system having the memory system.

Description of Related Art

A data storage system may include a host, and a memory system which may store data, output stored data, and erase stored data in response to a request from the host.

The memory system may include a storage device which stores data, and a controller which performs communication between a host and the storage device.

The memory device may include a volatile or nonvolatile memory device. In a volatile memory stored data is lost when the supply of power is interrupted, whereas in a nonvolatile memory device stored data is retained even when the supply of power is interrupted. Recently, as the use of portable electronic devices has increased, the use of nonvolatile memory devices has likewise gradually increased.

The controller may control data communication between the host and the memory device. For example, the controller may control the memory device in response to a request received from the host. Further, the controller may also perform a background operation so as to improve the performance of the memory system even when a request is not received from the host.

The host may communicate with the memory device through the controller using an interface protocol, such as Peripheral Component Interconnect-Express (PCI-E), Advanced Technology Attachment (ATA), Serial ATA (SATA), Parallel ATA (PATA) or Serial Attached SCSI (SAS). Other interface protocols that may be used for communication between the host and the memory system include Universal Serial Bus (USB), Multi-Media Card (MMC), Enhanced Small Disk Interface (ESDI), and Integrated Drive Electronics (IDE).

SUMMARY

Various embodiments of the present disclosure are directed to a controller that can determine the reliability of address mapping information stored in a host, and a data storage system having the controller.

An embodiment of the present disclosure is directed to a controller. The controller may include a mapping time generator configured to generate a first mapping time at which a logical block address and a physical block address are mapped to each other, an internal memory configured to store first address mapping information including an address map, in which the logical block address and the physical block address are mapped to each other, and the first mapping time, a host interface configured to transmit the first address mapping information to a host, and receive second address mapping information from the host, and a central processing unit configured to generate the address map, store the first address mapping information in the internal memory, compare a second mapping time included in the second address mapping information with the first mapping time, and select a read mode based on a result of the comparison.

Another embodiment of the present disclosure is directed to a data storage system. The data storage system may include a memory system configured to generate and output address mapping information including a mapping time at which a logical block address and a physical block address are mapped to each other, and an address map in which the logical block address and the physical block address are mapped to each other, and a host configured to receive and store the address mapping information, and output the address mapping information, together with a read request, to the memory system during a read operation, wherein the memory system is further configured to compare mapping times, respectively included in the address mapping information received from the host and the address mapping information stored in the memory system, during the read operation, and selects a mode of the read operation based on a result of the comparison.

Another embodiment of the present disclosure is directed to an operating method of a data storage system. The operating method may include generating, by the memory system, system-side map information including map data and generation time of the map data, storing in the host the system-side map information as host-side map information, providing, by the host, the memory system with an access request along with the host-side map information, and servicing, by the memory system, the access request based on the host-side map information when the generation time within the host-side information is the same as the system-side map information.

BRIEF DESCRIPTION OF THE DRAWINGS

FIG. 3 is a diagram for explaining in detail address mapping information stored in a host memory of FIG. 2.

FIG. 4 is a diagram illustrating in detail a controller of FIG. 1.

DETAILED DESCRIPTION

Figure 1:
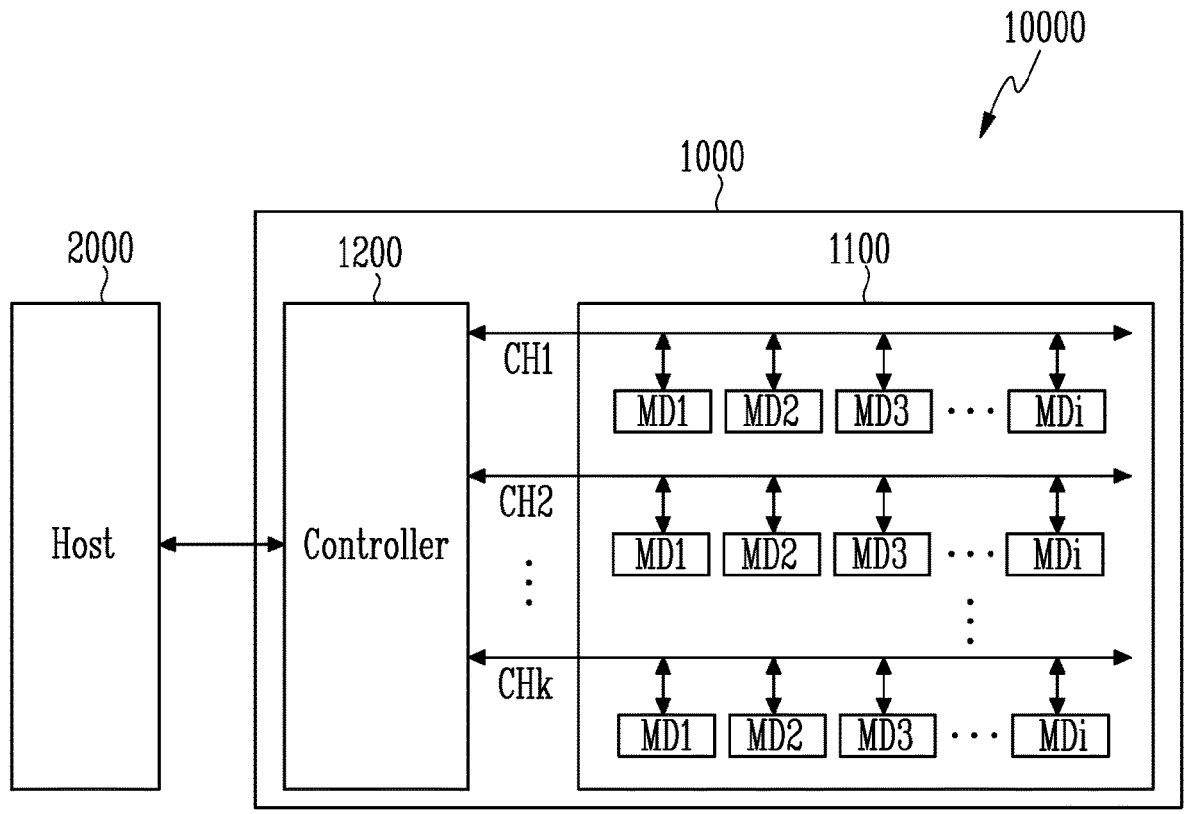
FIG. 1 is a diagram illustrating a data storage system according to an embodiment of the present disclosure.

FIG. 1 is a diagram illustrating a data storage system according to an embodiment of the present disclosure.

Referring to FIG. 1, a data storage system 10000 may include a memory system 1000 and a host 2000.

The memory system 1000 may include a storage device 1100 which stores data and a controller 1200 which performs communication between the storage device 1100 and the host 2000.

The storage device 1100 may include a plurality of memory devices MD1 to MDi. For example, each of the memory devices MD1 to MDi may be implemented as a volatile memory device in which stored data is lost when the supply of power is interrupted or as a nonvolatile memory device in which stored data is retained even when the supply of power is interrupted. By way of example, the following embodiments are illustrated and described in the context in which the memory devices MD1 to MDi are implemented as nonvolatile memory devices. Such a nonvolatile memory device may be a NAND flash memory device.

The memory devices (or memory dies) MD1 to MDi may be coupled to the controller 1200 through a plurality of channels CH1 to CHk (where k is a positive integer greater than 1). For example, first to i-th memory devices MD1 to MDi may be coupled to the first channel CH1, first to i-th memory devices MD1 to MDi may be coupled to the second channel CH2, and first to i-th memory devices MD1 to MDi may be coupled to the k-th channel CHk. The first to i-th memory devices MD1 to MDi coupled to one channel may be physically different than the memory devices MD1 to MDi coupled to a different channel. For example, physically different addresses may be assigned to the first memory device MD1 coupled to the first channel CH1 and to the first memory device MD1 coupled to the second channel CH2, respectively. Therefore, the physical addresses of corresponding memory devices coupled to different channels are different from each other.

The controller 1200 may perform communication between the host 2000 and the storage device 1100. For example, the controller 1200 may access the storage device 1100 in response to a request from the host 2000, or may access the storage device 1100 to perform a background operation.

The host 2000 may generate requests for various operations, and may output the generated requests to the memory system 1000. For example, the requests may include a program request for controlling a program operation, a read request for controlling a read operation, an erase request for controlling an erase operation, etc. The host 2000 may communicate with the memory system 1000 through various interfaces, such as Peripheral Component Interconnect Express (PCIe), Advanced Technology Attachment (ATA), Serial ATA (SATA), Parallel ATA (PATA), serial attached SCSI (SAS), Non-Volatile Memory Express (NVMe), Universal Serial Bus (USB), Multi-Media Card (MMC), Enhanced Small Disk Interface (ESDI), or Integrated Drive Electronics (IDE).

The host 2000 according to the present embodiment may store address mapping information, which was managed by the controller 1200 in a conventional scheme. For this operation, the controller 1200 may transmit the address mapping information to the host 2000 without storing the address mapping information.

For this operation, the controller 1200 may manage information about a time at which the address mapping information is generated.

The above-described host 2000 and controller 1200 are described in more detail below.

Figure 2:
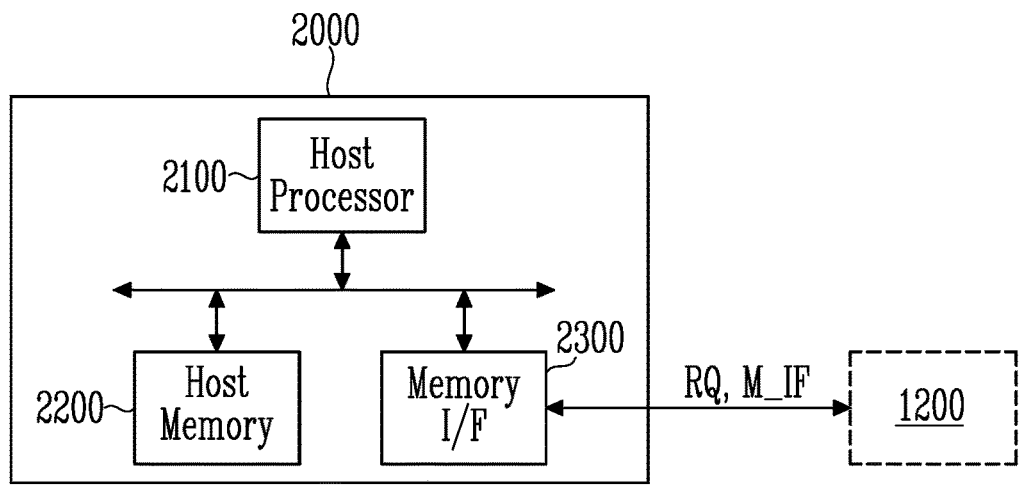
FIG. 2 is a diagram illustrating in detail a host of FIG. 1.

FIG. 2 is a diagram illustrating in detail the host of FIG. 1.

Referring to FIG. 2, the host 2000 may include a host processor 2100, a host memory 2200, and a memory interface (I/F) 2300.

The host processor 2100 may control the overall operation of the host 2000. For example, the host processor 2100 may generate various requests RQ to be transmitted to the memory system 1000. Also, the host processor 2100 may store address mapping information M_IF, received from the memory system 1000, in the host memory 2200, and may transmit the address mapping information M_IF to the memory interface 2300 so that the address mapping information M_IF, stored in the host memory 2200, is transmitted to the memory system 1000.

The host memory 2200 may store the address mapping information M_IF received from the memory system 1000. Also, the host memory 2200 may output the stored address mapping information M_IF under the control of the host processor 2100.

The memory interface 2300 may transmit the requests RQ and the address mapping information M_IF between the host 2000 and the memory system 1000. For example, the memory interface 2300 may output the requests RQ generated by the host processor 2100 to the memory system 1000, and may output the address mapping information M_IF selected from the host memory 2200 to the memory system 1000. Also, the memory interface 2300 may transmit the address mapping information M_IF, output from the memory system 1000, to the host memory 2200 under the control of the host processor 2100.

The host 2000 may include various other components in addition to the above-described host processor 2100, host memory 2200, and memory interface 2300.

FIG. 3 is a diagram for explaining in detail address mapping information stored in the host memory of FIG. 2.

Referring to FIG. 3, the host memory 2200 may store address mapping information M_IF. The address mapping information M_IF may store an index IND, a logical block address LBA #, a physical block address PBA #, and information about a mapping time T #. That is, the address mapping information M_IF may have the following fields: index IND, logical block address LBA #, physical block address PBA #, and mapping time T #. Each entry of address mapping information M_IF may be identified by the index IND field. The logical block address LBA # may be used by the host 2000, and the physical block address PBA # may be used by the memory system 1000. The mapping time T # may represent a time at which the address mapping information M_IF is generated in the memory system 1000.

Different logical block addresses LBA1 to LBA6 may be assigned to indices I1 to I6, different physical block addresses PBA1 to PBA6 may correspond to the logical block addresses LBA1 to LBA6, respectively, and pieces of mapping time information T1 to T6 may correspond to the physical block addresses PBA1 to PBA6, respectively. In other words, the logical block addresses LBA1 to LBA6, the physical block addresses PBA1 to PBA6, and the pieces of mapping time information T1 to T6 may be mapped to the indices I1 to I6, and may then be stored in the address mapping information M_IF. Since the pieces of mapping time information T1 to T6 may be generated by the memory system 1000 instead of the host 2000, the pieces of time information output from the memory system 1000 may be stored as the pieces of mapping time information T1 to T6.

Therefore, the indices I1 to I6, the logical block addresses LBA1 to LBA6, and the physical block addresses PBA1 to PBA6, which are stored in the host memory 2200, may have different values, and the pieces of mapping time information T1 to T6 may have different pieces of time information or have partially identical time information. For example, since different logical block addresses and physical block addresses may be mapped at the same time, the mapping times # may be identical to each other in that case.

FIG. 4 is a diagram illustrating in detail the controller of FIG. 1.

Referring to FIG. 4, the controller 1200 may include a central processing unit (CPU) 1210, an internal memory 1220, a mapping time generator 1230, a host interface (I/F) 1240, and a storage interface (I/F) 1250.

The central processing unit 1210 may control overall operation of the controller 1200. In an embodiment, the central processing unit 1210 may control an address mapping operation, compare address mapping times with each other, determine and selectively change an operation mode based on the result of a comparison between the address mapping times, and generate a command in the selected operation mode. In order to perform these operations, the central processing unit 1210 may include a map controller 210, a map comparator 220, a mode selector 230, and a command (CMD) generator 240.

The map controller 210 may generate an address map by mapping a logical block address and a physical block address to each other, and may check a time at which the addresses are mapped to each other. For example, the map controller 210 may store the address map in the internal memory 1220, and may store the mapping time generated by the mapping time generator 1230 in the internal memory 1220. That is, the map controller 210 may store address mapping information M_IF including the address map and the mapping time in the internal memory 1220.

The map comparator 220 may compare the mapping time information of an index received from the host 2000 with mapping time information of the corresponding index stored in the controller 1200. For example, the map comparator 220 may search the internal memory 1220 for an index identical to the index received from the host 2000, and may determine whether mapping time information corresponding to the found index is the same as or matches the mapping time information received from the host 2000.

The mode selector 230 may select the operation mode depending on the result of the comparison between the pieces of mapping time information performed by the map comparator 220. For example, when the pieces of mapping time information respectively stored in the host 2000 and the controller 1200 are identical to each other, the mode selector 230 may output a host mode signal so that a read operation can be performed using the address mapping information M_IF managed by the host 2000. When the pieces of mapping time information respectively stored in the host 2000 and the controller 1200 are different from each other, it may be determined that the address mapping information M_IF stored in the host 2000 is not updated with the most recent information. That is, since the mapping time information is generated by the controller 1200, the reliability of the mapping time information stored in the controller 1200 may be higher than that of the mapping time information stored in the host 2000. Therefore, when the pieces of mapping time information are different from each other, the mode selector 230 may output a normal mode signal so that the address mapping information M_IF stored in the controller 1200 may be used.

The command (CMD) generator 240 may generate the normal mode command or the host mode command in response to the signal output from the mode selector 230. For example, the command generator 240 may generate the host mode command in response to the host mode signal, and may generate the normal mode command in response to the normal mode signal. In the case of a read operation, the command generator 240 may generate a read command for the host mode or a read command for the normal mode.

The internal memory 1220 may store the address mapping information M_IF. That is, after the address mapping information M_IF has been stored in the internal memory 1220 of the controller 1200, the address mapping information M_IF stored in the internal memory 1220 may be transmitted to the host 2000.

The mapping time generator 1230 may generate time information about a time point at which the logical block address and the physical block address are mapped to each other. The time information generated by the mapping time generator 1230 may be transmitted to the internal memory 1220, and may then be included in the address mapping information M_IF. For example, the mapping signal generator 1230 may be implemented as a real-time clock (RTC) circuit, but is not limited that specific implementation. The mapping time generator 1230 may generate the time information in a form of a code composed of a plurality of bits.

The host interface 1240 may transfer the requests, data, address mapping information M_IF, and the like between the host 2000 and the controller 1200. For example, the host interface 1240 may receive the requests and the address mapping information M_IF output from the host 2000 and transmit the requests and the address mapping information M_IF to the central processing unit 1210. Also, the host interface 1240 may output the address mapping information M_IF output from the internal memory 1220 to the host 2000.

The storage interface 1250 may transfer commands, addresses, data, and the like between the controller 1200 and the storage device 1100. For example, the storage interface 1250 may output each command generated by the central processing unit 1210 to the storage device 1100, and may output a physical block address output from the internal memory 1220 to the storage device 1100. Also, the storage interface 1250 may receive data read from the storage device 1100 and transmit the read data to the host interface 1240 under the control of the central processing unit 1210.

Figure 5:
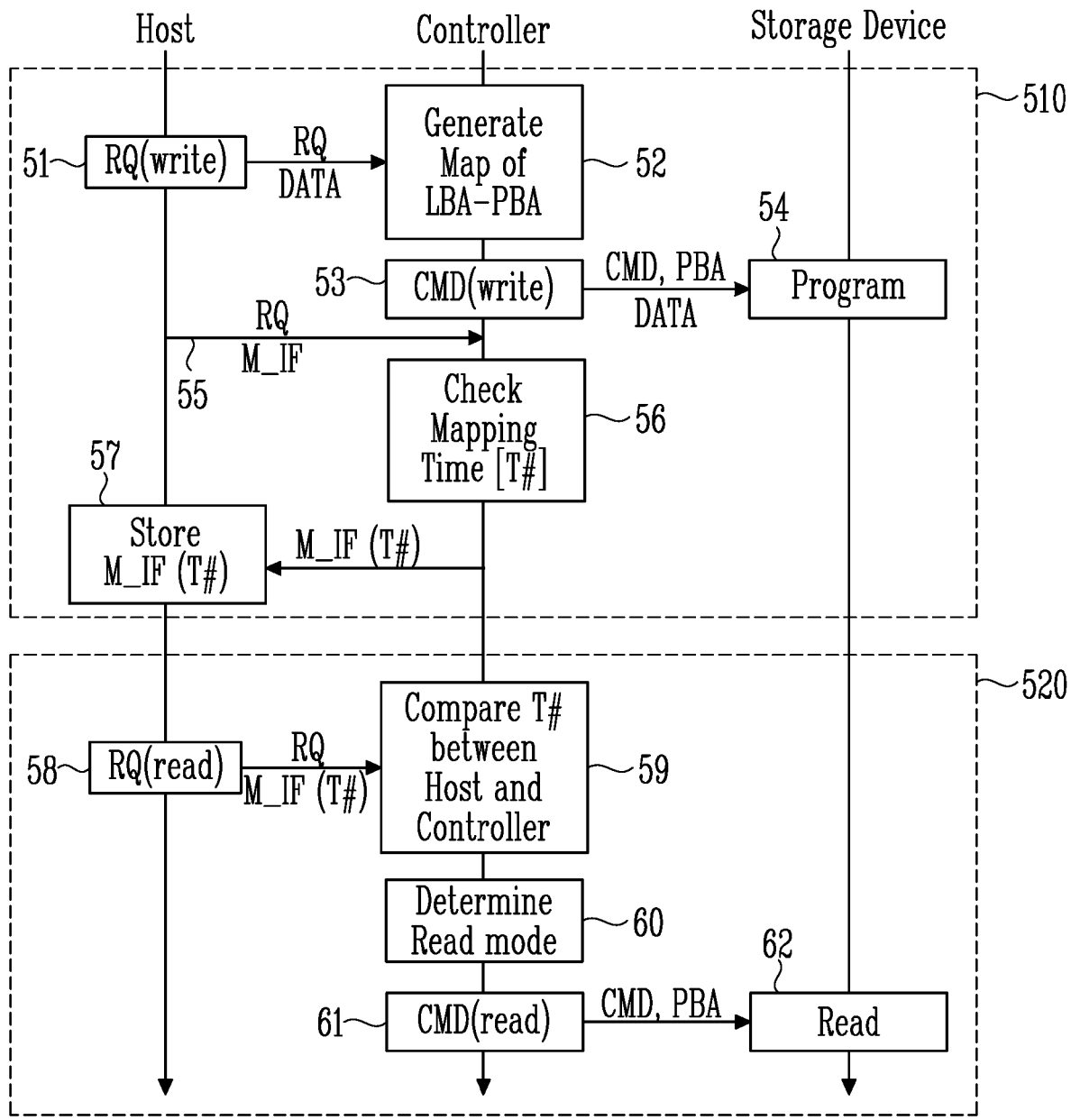
FIG. 5 is a diagram illustrating in detail a method of operating a data storage system according to an embodiment of the present disclosure.

FIG. 5 is a diagram illustrating in detail a method of operating a data storage system according to an embodiment of the present disclosure.

Referring to FIG. 5, the controller in the data storage system according to the present embodiment may store address mapping information in which a logical block address and a physical block address are mapped to each other, and the host may also store the address mapping information received from the controller. Therefore, during a read operation, the host may transmit the address mapping information, together with a read request, to the controller. The controller may generate a read command corresponding to the received read request, and may transmit a physical block address, together with the read command, to the storage device based on the received address mapping information. That is, an address mapping operation, which was performed by the controller during the read operation, may be omitted, and thus the workload of the controller may be reduced.

However, in the above-described scheme, when the reliability of the address mapping information received from the host is deteriorated, it is impossible to determine whether the received address mapping information is the same as, or matches, the address mapping information of the memory system. Since the address mapping information updated by the controller is transmitted to the host, the address mapping information stored in the host is the same as the address mapping information stored in the controller in most cases. However, when an unexpected situation, such as a sudden power-off, occurs, the address mapping information stored in the host may not be updated, and hence, may not be same as the address mapping information stored in the controller.

Accordingly, in the present embodiment, information indicating the time at which the addresses are mapped to each other may be used to determine whether the address mapping information stored in the controller is the same as the address mapping information stored in the host. This operation is described in detail as follows.

During a program operation 510, the host may transmit a write request RQ and data to the controller at step 51. The controller may generate an address map by mapping a physical block address PBA corresponding to a free block to a logical block address LBA at step 52. Alternatively, the host may transmit a logical block address LBA, at which data DATA is to be written, to the controller at step 51. Even in this case, the controller may map a selected physical block address PBA to the received logical block address LBA at step 52.

The controller may generate a write command CMD corresponding to the write request RQ at step 53, and may transmit the write command CMD, the physical block address PBA, and the data DATA to the storage device.

The storage device may write (program) the data DATA to a memory block corresponding to the received physical block address PBA in response to the write command CMD at step 54.

After the controller has transmitted the write command CMD to the storage device, the host may request address mapping information M_IF including a mapping time T # from the controller at step 55.

When a request for the mapping information M_IF is received from the host, the controller may check the time at which the logical block address LBA and the physical block address PBA are mapped to each other, and may then generate the mapping time T # at step 56. The mapping time T # may be included in the address mapping information M_IF.

Then, the controller may transmit the address mapping information M_IF including the mapping time T # to the host. For example, the address mapping information M_IF generated by the controller may be first address mapping information M_IF. When a request RQ to output the address mapping information M_IF is received from the host, the controller may output the first address mapping information M_IF to the host. An operation of transmitting the address mapping information M_IF to the host may be performed before the controller transmits the write command CMD, the physical block address PBA, and the data DATA to the storage device.

When the address mapping information M_IF including the mapping time T # is received, the host may store the address mapping information M_IF in the host memory (e.g., 2200 of FIG. 2) at step 57.

In this way, the host and the controller may individually store the same address mapping information M_IF.

The time at which the host requests the address mapping information M_IF including the mapping time T # from the controller is not limited to the time indicated above with respect to step 55 of FIG. 5. For example, the host may request the address mapping information M_IF from the controller before the controller outputs the write command CMD to the storage device, and in this case, the controller may output the address mapping information M_IF to the host before outputting the write command CMD to the storage device.

During a read operation 520 after the program operation has been completed, the host may transmit a read request RQ, together with address mapping information M_IF including the mapping time T #, to the controller at step 58. During the read operation, the address mapping information M_IF transmitted from the host to the controller may be second address mapping information M_IF.

The controller may compare the mapping time T # of the address mapping information M_IF received from the host with the mapping time T # of the address mapping information M_IF stored in the controller at step 59. In other words, the controller may compare the mapping times T #, respectively included in the first address mapping information M_IF stored in the controller and the second address mapping information M_IF received from the host, with each other.

The controller may determine a read mode based on the result of the comparison between the mapping times T # respectively stored in the host and the controller. For example, when the mapping times T # respectively stored in the host and the controller are the same, the controller may perform the read operation in a host mode, whereas when the mapping times are different, the controller may perform the read operation in a normal mode at step 60. In detail, when the mapping times T # respectively stored in the host and the controller are the same, the address mapping information M_IF stored in the host is the most recently updated information, and thus the controller may perform the read operation using the physical block address of the address mapping information M_IF received from the host. In this case, since the controller may omit an operation of searching for the physical block address mapped to the logical block address, the workload of the controller may be reduced, and an operating time may be shortened.

When the mapping times T # respectively stored in the host and the controller are different from each other, the address mapping information M_IF stored in the host is not the most recently updated information, and thus the controller may use only the logical block address without using the physical block address within the address mapping information M_IF received from the host. That is, since the controller may autonomously store and manage the address mapping information M_IF, the controller may search for a physical block address that is mapped to the logical block address included in the address mapping information M_IF received from the host. That is, in the normal mode, the physical block address stored in the controller may be used.

When the physical block address PBA is extracted, the controller may transmit the physical block address PBA and a read command CMD to the storage device at step 61.

The storage device may perform a read operation on a memory block corresponding to the physical block address in response to the received read command CMD at step 62.

The read operation 520 of the above-described data storage system is described in detail below.

Figure 6:
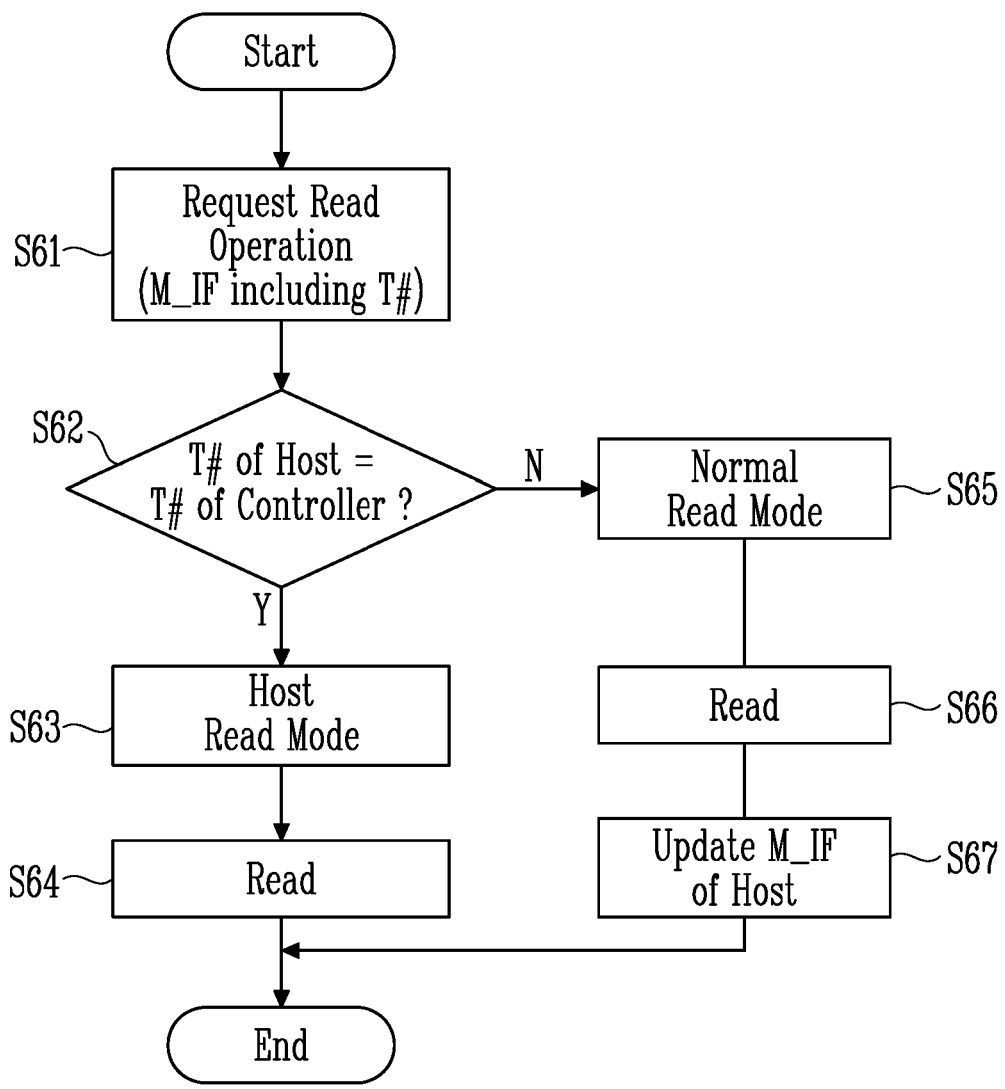
FIG. 6 is a flowchart illustrating in detail a read operation according to an embodiment of the present disclosure.

FIG. 6 is a flowchart illustrating in detail a read operation according to an embodiment of the present disclosure.

Referring to FIG. 6, during the read operation, the host may output a read request and address mapping information M_IF at step S61. The address mapping information M_IF output from the host may include a mapping time T #.

When the read request and the address mapping information M_IF are received from the host, the controller may determine whether the mapping time T # included in the received address mapping information M_IF is the same as or matches the mapping time T # stored in the controller at step S62.

When the mapping times T # of the host and the controller are the same as each other (Y at S62), the controller may be operated in a host read mode at step S63. In the host read mode the controller may omit an operation of autonomously searching for a physical block address mapped to the received logical block address and perform a read operation using a physical block address received from the host.

In the host read mode, when the controller transmits the read command and the physical block address to the storage device, the storage device may perform the read operation at step S64. When the controller outputs data read from the storage device to the host, the read operation may be terminated.

When the mapping times T # of the host and the controller are different from each other (N at S62), the controller may perform the read operation in a normal read mode at step S65. In the normal read mode, the controller may perform an operation of autonomously searching for a physical block address mapped to the received logical block address and perform a read operation using the found physical block address.

In the normal read mode, when the controller transmits the read command and the physical block address to the storage device, the storage device may perform the read operation at step S66. The controller may output data read from the storage device to the host.

Next, the controller may transmit address mapping information M_IF stored in an internal memory to the host in order to update the address mapping information M_IF stored in the host with the most recent information at step S67.

The order in which steps S66 and S67 are performed may be changed depending on the settings of the memory system.

Figure 7:
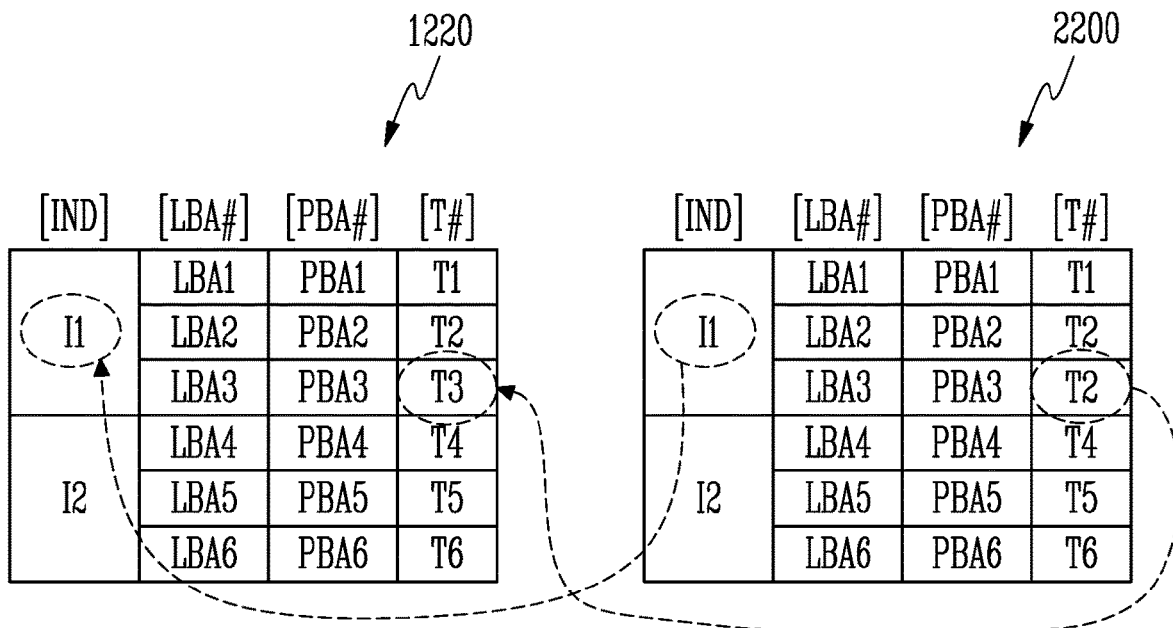
FIG. 7 is a diagram illustrating in detail a method of comparing mapping times.

FIG. 7 is a diagram illustrating in detail a method of comparing mapping times.

Referring to FIG. 7, address mapping information M_IF including the logical block address LBA #, the physical block address PBA #, and the mapping time T # is stored in the internal memory 1220 of the controller, and thus the controller may compare indices IND and mapping times T # of respective entries of address mapping information M_IF with each other. That is, when address mapping information M_IF for a first index I1 is received from the host, the controller may compare the mapping time T # corresponding to the first index I1, among entries of address mapping information M_IF stored in the internal memory 1220, with the mapping time T # received from the host.

For example, when the mapping time T # corresponding to a first index I1 of the host memory 2200 is a second time T2, and the mapping time T # corresponding to the first index I1 of the internal memory 1220 of the controller is a third time T3, the controller may perform a read operation in a normal mode. That is, the fact that the mapping times T2 and T3 are different from each other means that the address mapping information M_IF stored in the host memory 2200 is not the most recently updated information, and thus the physical block address of the first index I1 may be different from that of the memory system.

Therefore, after performing the read operation in the normal mode, the controller may transmit address mapping information M_IF corresponding to the first index I1 stored in the internal memory 1220 to the host. The host may update the address mapping information M_IF of the first index I1 based on the received address mapping information MIF.

Figure 8:
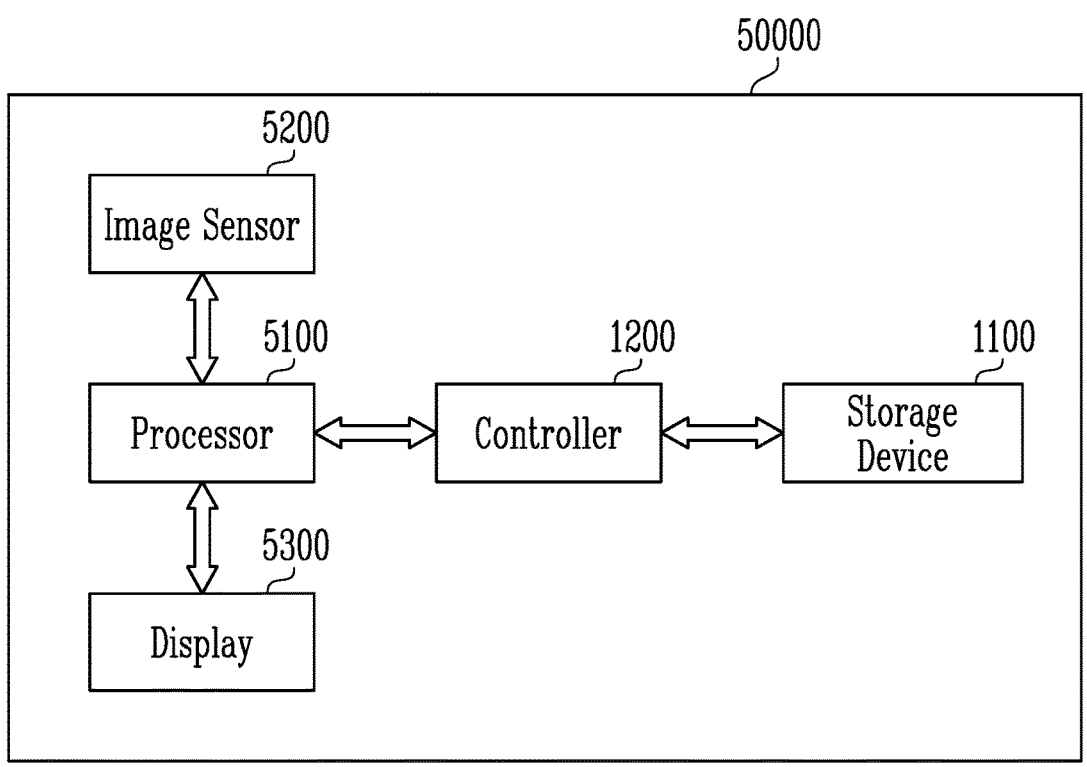
FIG. 8 is a diagram illustrating a memory system including a controller according to an embodiment of the present disclosure.

FIG. 8 is a diagram illustrating a memory system including a controller according to an embodiment of the present disclosure.

Referring to FIG. 8, a memory system 50000 may be implemented as an image processing device, e.g., a digital camera, a smartphone provided with a digital camera, or a tablet PC provided with a digital camera.

The memory system 50000 may include a storage device 1100 and a controller 1200 which is capable of controlling a data processing operation of the storage device 1100, for example, a program operation, an erase operation or a read operation.

An image sensor 5200 of the memory system 50000 may convert an optical image into digital signals, and the digital signals may be transmitted to a processor 5100 or the controller 1200. Under the control of the processor 5100, the digital signals may be output via a display 5300 or may be stored in the storage device 1100 through the controller 1200. Further, data stored in the storage device 1100 may be output via the display 5300 under the control of the processor 5100 or the controller 1200.

In an embodiment, the controller 1200 capable of controlling the operation of the storage device 1100 may be implemented as a part of the processor 5100 or as a chip provided separately from the processor 5100.

As described above, the controller 1200 may store and update the address mapping information, and may determine the reliability of the address mapping information based on the mapping time included in the address mapping information received from the host.

Figure 9:
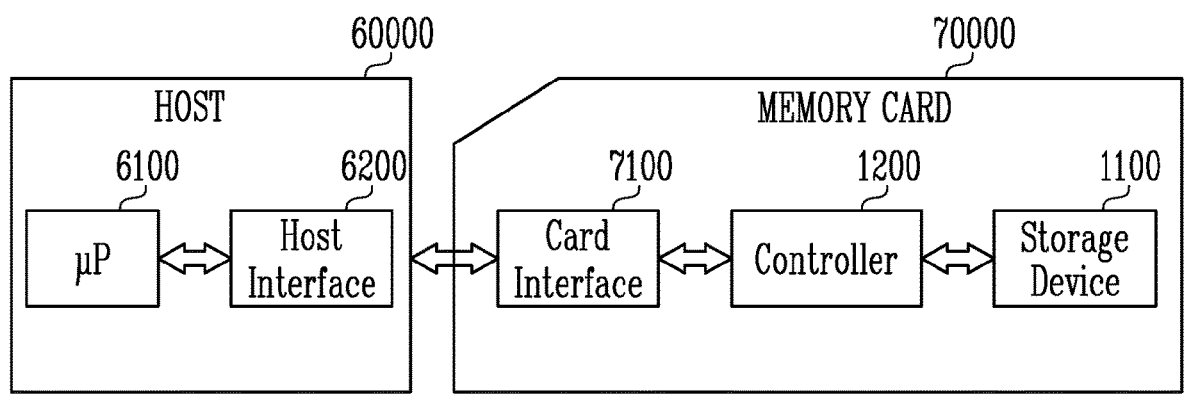
FIG. 9 is a diagram illustrating a memory system including a controller according to an embodiment of the present disclosure.

FIG. 9 is a diagram illustrating a memory system including a controller according to an embodiment of the present disclosure.

Referring to FIG. 9, a memory system 70000 may be implemented as a memory card or a smart card. The memory system 70000 may include a storage device 1100, a controller 1200, and a card interface 7100.

The controller 1200 may control data exchange between the storage device 1100 and the card interface 7100. In an embodiment, the card interface 7100 may be, but is not limited to, a secure digital (SD) card interface or a multimedia card (MMC) interface.

Further, as described above, the controller 1200 may store and update address mapping information, and may determine the reliability of the address mapping information based on mapping times included in the address mapping information received from a host 60000.

The card interface 7100 may interface data exchange between the host 60000 and the controller 1200 according to a protocol of the host 60000. In an embodiment, the card interface 7100 may support a universal serial bus (USB) protocol and an interchip (IC)-USB protocol. Here, the card interface 7100 may refer to hardware capable of supporting a protocol which is used by the host 60000, software installed in the hardware, or a signal transmission method performed by the hardware.

When the memory system 70000 is coupled to a host interface 6200 of the host 60000 such as a PC, a tablet PC, a digital camera, a digital audio player, a mobile phone, console video game hardware or a digital set-top box, the host interface 6200 may perform data communication with the storage device 1100 through the card interface 7100 and the controller 1200 under the control of a microprocessor (μP) 6100.

In accordance with embodiments of the present disclosure, a controller may determine whether address mapping information stored in a host is the most recent information, change a read mode based on the result of the determination, and update address mapping information stored in the host, thus improving the reliability of the read operation of a data storage system.

Also, the microprocessor 6100 may store and update address mapping information received from the controller 1200, and may output the address mapping information together with a read request during a read operation.

What is claimed is:

1. A controller, comprising:
    a mapping time generator configured to generate a first mapping time at which a logical block address and a physical block address are mapped to each other;
    an internal memory configured to store first address mapping information including an address map, in which the logical block address and the physical block address are mapped to each other, and the first mapping time;
    a host interface configured to transmit the first address mapping information to a host, and receive second address mapping information from the host; and
    a central processing unit configured to generate the address map, store the first address mapping information in the internal memory, compare a second mapping time included in the second address mapping information with the first mapping time, and select a read mode based on a result of the comparison,
    wherein the central processing unit is further configured to use the physical block address in the second address mapping information or the physical block address in the first address mapping information depending upon the result of the comparison.

2. The controller according to claim 1, wherein the mapping time generator generates the first mapping time in a form of a code composed of a plurality of bits.

3. The controller according to claim 1, wherein the mapping time generator comprises a real-time clock (RTC) circuit.

4. The controller according to claim 1, wherein the central processing unit comprises:
    a map controller configured to generate the address map and store the first address mapping information in the internal memory;
    a map comparator configured to compare the first mapping time with the second mapping time;
    a mode selector configured to select the read mode based on the result of the comparison by the map comparator; and
    a command generator configured to generate a command based on the selected read mode.

5. The controller according to claim 4, wherein the map comparator determines whether or not the first mapping time is the same as the second mapping time.

6. The controller according to claim 4, wherein the mode selector is configured to:
    output a host mode signal when it is determined that the first mapping time is the same as the second mapping time, and
    output a normal mode signal when it is determined that the first mapping time is different from the second mapping time.

7. The controller according to claim 6, wherein the command generator is configured to:
    generate a host mode command in response to the host mode signal, and
    generate a normal mode command in response to the normal mode signal.

8. The controller according to claim 7, wherein the central processing unit is configured to use:
    the physical block address in the second address mapping information when the host mode command is generated, and
    the physical block address in the first address mapping information when the normal mode command is generated.

9. The controller according to claim 8, wherein the central processing unit is configured to transmit the first address mapping information to the host.

10. A data storage system, comprising:
    a memory system configured to generate and output address mapping information including a mapping time at which a logical block address and a physical block address are mapped to each other, and an address map in which the logical block address and the physical block address are mapped to each other; and
    a host configured to receive and store the address mapping information, and output the address mapping information, together with a read request, to the memory system during a read operation,
    wherein the memory system is further configured to compare mapping times, respectively included in the address mapping information received from the host and the address mapping information stored in the memory system, during the read operation, and selects a mode of the read operation based on a result of the comparison, and
    wherein the memory system is further configured to use the physical block address in the address mapping information received from the host or the physical block address in the address mapping information stored in the memory system depending on the result of the comparison.

11. The data storage system according to claim 10, wherein the host comprises:
    a host memory configured to store the address mapping information received from the memory system; and
    a host processor configured to generate the read request, receive the address mapping information from the memory system, and transmit the address mapping information stored in the host memory to the memory system.

12. The data storage system according to claim 11, wherein the address mapping information includes fields of an index, the logical block address, the physical block address, and the mapping time.

13. The data storage system according to claim 10, wherein the memory system comprises:
    a storage device configured to store data; and
    a controller configured to perform communication between the storage device and the host.

14. The data storage system according to claim 13, wherein the controller comprises:
    a mapping time generator configured to generate the mapping time;
    an internal memory configured to store the address mapping information including the address map and the mapping time; and
    a central processing unit configured to generate the address map, store the address mapping information in the internal memory, compare the mapping times, and select the mode based on a result of the comparison.

15. The data storage system according to claim 14, wherein the mapping time generator generates the mapping time in a form of a code composed of a plurality of bits.

16. The data storage system according to claim 14, wherein the central processing unit comprises:
    a map controller configured to generate the address map and store the address mapping information in the internal memory;
    a map comparator configured to compare the mapping time received from the host with the mapping time stored in the internal memory;
    a mode selector configured to select the mode depending on a result of the comparison by the map comparator; and
    a command generator configured to generate a command based on the selected mode.

17. The data storage system according to claim 16, wherein the map comparator determines whether or not the mapping time received from the host is the same as the mapping time stored in the internal memory.

18. The data storage system according to claim 16, wherein the mode selector is configured to:
    output a host mode signal when it is determined that the mapping time received from the host is the same as the mapping time stored in the internal memory, and
    output a normal mode signal when it is determined that the mapping time received from the host is different from the mapping time stored in the internal memory.

19. An operating method of a data storage system including a host and a memory system, the operating method comprising:
    generating, by the memory system, system-side map information including map data and generation time of the map data;
    storing in the host the system-side map information as host-side map information;
    providing, by the host, the memory system with an access request along with the host-side map information;
    determining that the generation time within the host-side map information is the same as the system-side map information; and
    servicing, by the memory system, the access request based on the host-side map information in response to the determination that the generation time within the host-side map information is the same as the system-side map information,
    wherein the memory system is configured to use a physical block address in the host-side map information in response to the determination that the generation time within the host-side map information is the same as the system-side map information.

* * * * *